Patented Dec. 25, 1934

1,985,810

UNITED STATES PATENT OFFICE 1,985,810

PREPARATION OF SUPERPHOSPHATE

Edward Hyatt Wight, David L. Anderson, and William N. Watmough, Jr., Baltimore, Md.

No Drawing. Application April 18, 1932, Serial No. 606,074

9 Claims. (Cl. 71—7)

This invention relates to fertilizers and more particularly to an improved method of preparing phosphatic fertilizers.

The usual method of preparing superphosphate fertilizer comprises mixing phosphate rock dust and sulphuric acid in a pan and mixing the ingredients by rotating paddles. This mass is then dumped into a den and additional masses are made up in the pan and subsequently deposited one on another in the den. The whole mass within the den is allowed to react further, usually for a day or less and then it is removed and dumped on an open curing pile. The reactions involved in the transportation of the insoluble tricalcium phosphate of the rock to the agriculturally available fertilizer salts take considerable time to run to completion and hence where the circumstances of manufacture permit, it is usually the practice to allow the material to remain in the pile for a month or more.

Before the product is shipped it is milled and usually bagged. Such superphosphate has a decided tendency to attack and deteriorate the bags. This material also has such a pronounced tendency to set or cake that it is necessary to remill it before and after compounding the different formulae and before bagging it. The bag rotting tendency can be minimized by adding to the fertilizer such materials as rock dust, ammonia or lime which take up or neutralize the free acid. Such methods, however, do not completely eliminate the bag deterioration and set.

Such a process involving as it does a protracted period of manufacture and excessive rehandling and regrinding is an expensive method. The tendency of the fertilizer to set, necessitating the remilling is one of the most expensive features in the industry.

According to the present invention a fertilizer may be prepared in a relatively short period of time, without employing the large and expensive den equipment and in a much shorter period of time than heretofore. The fertilizer prepared by the present improved process, unlike that prepared by the den method, is non-setting and has little or no deleterious actions upon the bags.

It is therefore an object of the present invention to prepare a novel phosphatic fertilizer.

Another object is to provide an improved process of manufacturing phosphatic fertilizer.

With these and other equally important objects in view, the invention comprehends the concept of mixing ground phosphate rock and an acid in a container under such conditions as will nodulize the material, and then preferably subsequently subjecting the phosphate nodules to a special heat treatment to obtain a cured non-setting and non-bag-rotting fertilizer.

In carrying out the invention, a predetermined quantity of rock dust and a strong acid such as sulphuric are mixed and deposited in a rotary cylinder in which the mass is nodulized. If desired, the acid and rock may be admixed for a very short period in a mixing pan and then dumped into the cylinder in which it is nodulized. In the preferred method of operation, however, streams of predetermined quantities of the dust and acid are conjoined in such a manner as to thoroughly mix the two ingredients and the mixture emptied into the cylinder. The charging device employed may, for example, be similar to that described in copending application Serial No. 629,547.

The nodulizing step may be carried out in a number of specifically different apparatus. The purpose of these steps is to change the phosphatic material from a massive formation to the form of individually distinct nodules. During the period the mass is being nodulized or reduced to ball form, the reaction between the rock and acid progresses so that this nodulizing stage is also a digesting stage. The conditions of operation during nodulation are so controlled as to accelerate the reaction effecting chemical conversion.

In one form of the invention the compounded mixture of rock dust and acid is charged into a horizontal rotary cylinder of sufficient size to accommodate the charges employed. Such an element may comprise a cylinder approximately thirty feet long and about four feet in diameter mounted for rotation on suitable bearings. The cylinder preferably is formed with a closure at one end. The charging pipe enters, through the closure at one end, on the axis of rotation of the cylinder and an outlet gas pipe is mounted at the other end, being similarly positioned on the axis of rotation. In the gas outlet line is positioned a suction device for withdrawing the gases and vapors generated during conversion.

With this form of unit, therefore, a compounded mixture of rock dust and acid of about five tons is rolled around or kneaded by the rotating action of the cylinder. This constant rotation breaks up the mass and causes the formation of nodules or balls of the material. During this mechanical nodulation the digestion proceeds with the evolution of vapors and gases. These are evacuated by the action of the suction device so that substantially atmospheric pressure is maintained during the nodulation. As the reactions proceed the gases and vapors evolving from the mass tend to make the balls more porous, but the kneading action caused by the rotating cylinder densifies the exposed surfaces.

Accordingly, at the present it is preferred to carry on the nodulation only long enough to insure the formation of the nodules or balls of sufficient strength to maintain this individual character and withstand subsequent handling. As the acid and rock react, gases are given off and solid end products are formed. With the formation of the solid end products, the mass first becomes stiff and then solid. Therefore, after the mass has been agitated and permitted to react long enough to form relatively strong individual nodules or balls, these nodules are discharged from the cylinder and deposited on a curing pile.

The mass of nodules is permitted to remain in the pile for a period of approximately twenty-four hours more or less. During this time the reactions initiated in the cylinder continue and additional quantities of the contained acid in the nodules react with the unavailable phosphate. At the end of such a period, therefore, the material is more completely reacted and as a result the nodules or balls possess greater mechanical strength. If desired, after nodulation the balls may be cracked, say down to 3 or 4 mesh and then allowed to cure.

After this brief curing period, the superphosphate is then specially conditioned. This special conditioning process comprises heating the superphosphate at temperatures sufficiently high and for a period sufficiently long so that an appreciable quantity of fluorine is removed and so that the resulting product does not materially rot the bags. The whole or cracked nodules of superphosphate are fed into an inclined horizontal rotary dryer and flowed therethrough while being contacted with a large volume of hot inert gas flowing concurrently with the phosphate. The dryer may comprise a cylinder approximately 27 feet in length and 3½ feet in diameter, rotating at about 10 R. P. M. This dryer preferably is slightly inclined, having for example a pitch of five inches in twenty-seven feet. It is preferably provided with flights five inches high and twenty-six feet long, generated on a twenty-eight twist spiral. In this element the water content of the mass is reduced down to at least below four and preferably below three percent. The temperature of the inlet gases are of the order of 1800° F. and the temperature of the product at discharge is preferably about 200° F. In the preferred form of operation the nodules, or cracked nodules, of superphosphate are fed into one end of the dryer and the product removed by screw conveyer and elevator. The material may be passed through the dryer at the approximate rate of about eight tons per hour.

While no exact theory or rationale of the process is attempted to be given, it appears that under the conditions of this treatment the quantity of fluorine and the character of the siliceous material are probably materially modified. However, whatever be the chemical or physical changes taking place, it is found that as a result of such heat treatment a non-setting fertilizer is obtained which has little or no deteriorating action upon the bags. This treated material may then be ground for shipment or formulation.

While the process has been described as nodulizing superphosphate in an unheated rotary container while withdrawing gases and vapors sufficiently rapidly to maintain substantially atmospheric pressure, it will be appreciated that other methods may be employed. Thus if desired, the cylinder may be provided with a thermal jacket or a hot gas or vapor may be admitted to the container during the nodulizing step so as to accelerate the chemical reactions taking place.

Likewise, by connecting the gas outlet to a vacuum pump and operating this during the nodulation such nodulation may be carried out under reduced pressure either with or without the application of internal or external heat.

Similarly, if desired, by retaining a predetermined quantity of evolved gases and vapors within the container the nodulation may be carried out under pressure and with or without applied heat.

In any case, the major features of the invention comprise mixing and nodulizing the phosphate for a period of time sufficient to insure the formation of relatively strong or resistant nodules; the curing of such nodules and the subsequent conditioning of these by a heat treatment so controlled as to render the product practically non-setting and non-bag-rotting.

It is particularly to be noted that the physical condition of the material after nodulation, and preferably when nodulized under pressure, renders it very amenable to rapid curing. The nodules or balls are easily handled and piled, are denser than the normal den super, and hence are in a better physical condition for chemical reaction. The purpose of the intermediate curing step, as will be appreciated, is to allow more complete reaction and increase the availability of the $P_2O_5$ to a practical maximum before drying. This intermediate curing step is practically necessary because the special drying treatment in effect terminates the curing reaction.

As illustrative embodiments of the invention, the following operations, which have actually been carried out, are given by way of example. A charge of 3 tons of phosphate rock and acid, at a ratio of 100 to 88, with an acid concentration of 52° Bé. and an acid temperature of 105° F., was charged to a rotary container of the character described, namely one sealed at both ends and provided with means for withdrawing the gases and vapors so as to maintain substantially atmospheric pressures. In the particular tests run the gases and vapors were withdrawn by a vacuum pump which was operated continuously and which drew air continuously through and over the material. This material was rotated in the container for a period of approximately three hours. During this period no heat was applied to the mass. At the end of this period the material was discharged from the container in the form of damp balls or nodules. This material was allowed to remain in the curing pile for a period of approximately twenty-four hours. This material was then charged into a rotary dryer of the character described in the copending application referred to, and after being heat treated was withdrawn to the storage pile. The following analyses show the results of this type of treatment.

*Table I.—Analysis of material after nodulation and twenty-four hour curing period*

|  | Per cent |
|---|---|
| Moisture | 8.65 |
| Total $P_2O_5$ | 20.55 |
| Insol. $P_2O_5$ | 1.63 |
| Available $P_2O_5$ | 18.92 |
| Free acid | 7.4 |
| Acidulation | 92.2 | ratio (calculated as follows:

$$\frac{\text{Available } P_2O_5}{\text{Total } P_2O_5} \text{ multiplied by 100})$$

*Table Ia.—After the special heat treatment this material analyzed as follows*

|  | Per cent |
|---|---|
| Moisture | 1.35 |
| Total $P_2O_5$ | 22.47 |
| Insol. $P_2O_5$ | 1.75 |
| Available $P_2O_5$ | 20.72 |
| Free acid | 3.5 |
| Acidulation | 92.2 | ratio (calculated as follows:

$$\frac{\text{Available } P_2O_5}{\text{Total } P_2O_5} \text{ multiplied by 100})$$

*Table II.—Material nodulized and cured 24 hours*

|  | Per cent |
|---|---|
| Moisture | 6.75 |
| Total $P_2O_5$ | 20.17 |
| Insol. $P_2O_5$ | 1.67 |
| Available $P_2O_5$ | 18.5 |
| Free acid | 6.7 |
| Acidulation | 91.7 | ratio (calculated as follows:

$$\frac{\text{Available } P_2O_5}{\text{Total } P_2O_5} \text{ multiplied by 100})$$

*Table IIa.—Analysis of material after it was conditioned in the direct heat dryer*

|  | Per cent |
|---|---|
| Moisture | 1.25 |
| Total $P_2O_5$ | 22.33 |
| Insol. $P_2O_5$ | 1.87 |
| Available $P_2O_5$ | 20.46 |
| Free acid | 3.8 |
| Acidulation | 91.7 | ratio (calculated as follows:

$$\frac{\text{Available } P_2O_5}{\text{Total } P_2O_5} \text{ multiplied by 100}).$$

The product obtained is characterized by a high availability for it is found that under the conditions of the heat treatment substantially no reversion occurs. The product besides having a high availability is relatively more concentrated than ordinary superphosphate due to its low water content. Since the material does not set either alone or in admixture with other fertilizer materials, it becomes possible to make up standard or stock formulae at the fertilizer plant for immediate shipment, thus eliminating the expense and trouble entailed in the remilling of superphosphate and mixed goods as now obtains.

While preferred embodiments of the invention have been described, it is to be understood that these are given merely as typical methods by which the underlying principles of the invention may be realized.

We claim:

1. A process of manufacturing superphosphate which comprises nodulizing a plastic mass of phosphate rock and acid in a rotary container while applying heat to the mass and permitting the reaction to continue to a point short of that desired, allowing the nodulated product to cure for a period of time sufficient to insure a substantial conversion and a good mechanical strength, and then heating the product in a rotary dryer at a temperature and for a period of time sufficient to reduce the water content below four percent.

2. A process of manufacturing superphosphate which comprises nodulizing a plastic mass of phosphate rock and acid in a rotary container while applying heat to the mass and permitting the reaction to continue to a point short of that desired, allowing the nodules to cure for a period of time sufficient to insure a substantial additional conversion and a relatively high mechanical strength, then heating the product in a rotary dryer at a temperature sufficiently high and for a time sufficiently long to raise the temperature of the product to a point where the active fluorine is expelled and the siliceous material substantially dehydrated.

3. A process of preparing superphosphate which comprises nodulizing a plastic mass of phosphate rock and acid under pressure in a rotary container while converting the mass only partly to the desired extent, allowing the nodulated product to cure for a period of time sufficient to insure a substantial conversion and a good mechanical strength, and then heating the product in a rotary dryer at a temperature and for a period of time sufficient to reduce the water content below four percent.

4. A process of preparing superphosphate which comprises nodulizing a mass of phosphate rock and acid under reduced pressure stopping such nodulation step short of attaining desirable conversion, allowing the nodules to cure for a period of time sufficient to insure a substantial additional conversion and a relatively high mechanical strength, then heating the product in a rotary dryer at a temperature sufficiently high and for a time sufficiently long to raise the temperature of the product to a point where the active fluorine is expelled and the siliceous material substantially dehydrated.

5. A process of preparing superphosphate which comprises nodulizing a mass of phosphate rock and acid under pressure while converting it only partially to the desired extent, and while applying heat in a rotary container, allowing the nodulated product to cure for a period of time sufficient to insure a substantial conversion and a good mechanical strength, and then heating the product in a rotary dryer at a temperature and for a period of time sufficient to reduce the water content below four percent.

6. A process of preparing superphosphate which comprises nodulizing a mass of phosphate rock and acid under reduced pressure while applying heat, permitting the reaction to continue to a point short of that desired, allowing the nodules to cure for a period of time sufficient to insure a substantial additional conversion and a relatively high mechanical strength, then heating the product in a rotary dryer at a temperature sufficiently high and for a time sufficiently long to raise the temperature of the product to a point where the active fluorine is expelled and the siliceous material substantially dehydrated.

7. A process of preparing superphosphate which comprises nodulating a mass of phosphate rock and acid under pressure, reducing the pressure during nodulation, then passing the nodulated material to a cure step where it is exposed to the atmospheric air, allowing the nodules to cure for a period of time sufficient to insure a substantial additional conversion and a relatively high mechanical strength, then heating the product in a rotary drier at a temperature sufficiently high and for a time sufficiently long to raise the temperature of the product to a point where the active fluorine is expelled and the siliceous material substantially dehydrated.

8. A process of preparing superphosphate which comprises nodulizing a mass of phosphate rock and acid under pressure while applying heat in a rotary container, reducing the pressure in that container, passing the material to a curing step, allowing the nodules to cure for a period of time sufficient to insure a substantial additional conversion and a relatively high mechanical strength, then heating the product in a rotary drier at a temperature sufficiently high and for a time sufficiently long to raise the temperature of the product to a point where the active fluorine is expelled and the siliceous material substantially dehydrated.

9. A process of manufacturing superphosphate which comprises nodulizing a mass of phosphate rock and acid while converting it only partly to the desired extent, allowing the nodules to cure for a period of time sufficient to insure a substantial additional conversion and a relatively high mechanical strength, then subjecting the product to a heating and drying step wherein it is raised to a sufficiently high temperature for a sufficiently great length of time to substantially expel the active fluorine and to substantially dehydrate the siliceous material.

EDWARD HYATT WIGHT.
DAVID L. ANDERSON.
WILLIAM N. WATMOUGH, Jr.